United States Patent
Witt

(10) Patent No.: US 6,321,326 B1
(45) Date of Patent: *Nov. 20, 2001

(54) PREFETCH INSTRUCTION SPECIFYING DESTINATION FUNCTIONAL UNIT AND READ/WRITE ACCESS MODE

(75) Inventor: David B. Witt, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/569,102

(22) Filed: May 10, 2000

Related U.S. Application Data

(63) Continuation of application No. 09/078,226, filed on May 13, 1998, now Pat. No. 6,088,789.

(51) Int. Cl.[7] ............................................. G06F 15/00
(52) U.S. Cl. ......................... 712/207; 711/119; 711/113
(58) Field of Search ................................... 711/119, 120, 711/121, 122, 140, 113; 712/205, 206, 207, 217, 220, 225

(56) References Cited

U.S. PATENT DOCUMENTS

| | | | |
|---|---|---|---|
| 5,317,716 | 5/1994 | Liu | 716/144 |
| 5,510,934 | 4/1996 | Brennan et al. | 711/119 |
| 5,551,001 | 8/1996 | Cohen et al. | 711/122 |
| 5,592,679 | 1/1997 | Yung | 712/23 |
| 5,613,136 * | 3/1997 | Casavant | 395/800 |
| 5,644,752 | 7/1997 | Cohen et al. | 711/122 |
| 5,732,242 | 3/1998 | Mowry | 711/136 |
| 5,768,555 | 6/1998 | Tran et al. | 712/216 |
| 5,778,423 | 7/1998 | Sites | 711/118 |
| 5,784,588 | 7/1998 | Leung | 712/216 |
| 5,796,971 * | 8/1998 | Emberson | 395/383 |
| 5,802,338 | 9/1998 | Rechtschaffen et al. | 712/217 |
| 5,829,025 * | 10/1998 | Mittal | 711/122 |
| 5,838,945 | 11/1998 | Emberson | 712/200 |
| 5,845,101 | 12/1998 | Johnson | 712/207 |
| 5,898,849 | 4/1999 | Tran | 712/203 |
| 5,898,852 | 4/1999 | Petolino | 435/31 |
| 5,944,815 | 8/1999 | Witt | 310/237 |
| 6,088,789 * | 7/2000 | Witt | 712/207 |
| 6,131,145 * | 10/2000 | Matsubara | 711/137 |

OTHER PUBLICATIONS

Mowry, Todd C., Tolerating Latency Through Software–Controlled Data Prefetching, Stanford University, pp. 121–176.

* cited by examiner

*Primary Examiner*—John F. Niebling
*Assistant Examiner*—Stacy Whitmore
(74) *Attorney, Agent, or Firm*—Conley, Rose & Tayon, PC; Lawrence J. Merkel

(57) ABSTRACT

A microprocessor is configured to execute a prefetch instruction specifying a cache line to be transferred into the microprocessor, as well as an access mode for the cache line. The microprocessor includes caches optimized for the access modes. In one embodiment, the microprocessor includes functional units configured to operate upon various data type. Each different type of functional unit may be connected to different caches which are optimized for the various access modes. The prefetch instruction may include a functional unit specification in addition to the access mode. In this manner, data of a particular type may be prefetched into a cache local to a particular functional unit.

20 Claims, 4 Drawing Sheets

40

PREFETCH INSTRUCTION SPECIFYING DESTINATION FUNCTIONAL UNIT AND READ/WRITE ACCESS MODE

This application is a continuation of U.S. patent application Ser. No. 09/078,226 filed May 13, 1998 now U.S. Pat. No. 6,088,789.

BACKGROUND OF THE INVENTION

1. Field of the Invention

This invention relates to the field of microprocessors and, more specifically, to prefetching and caching within microprocessors.

2. Description of the Related Art

Superscalar microprocessors achieve high performance by executing multiple instructions per clock cycle and by choosing the shortest possible clock cycle consistent with the design. On the other hand, superpipelined microprocessor designs divide instruction execution into a large number of subtasks which can be performed quickly, and assign pipeline stages to each subtask. By overlapping the execution of many instructions within the pipeline, superpipelined microprocessors attempt to achieve high performance.

Superscalar microprocessors demand low memory latency due to the number of instructions attempting concurrent execution and due to the increasing clock frequency (i.e. shortening clock cycle) employed by the superscalar microprocessors. Many of the instructions include memory operations to fetch (read) and update (write) memory operands. The memory operands must be fetched from or conveyed to memory, and each instruction must originally be fetched from memory as well. Similarly, superpipelined microprocessors demand low memory latency because of the high clock frequency employed by these microprocessors and the attempt to begin execution of a new instruction each clock cycle. It is noted that a given microprocessor design may employ both superscalar and superpipelined techniques in an attempt to achieve the highest possible performance characteristics.

Microprocessors are often configured into computer systems which have a relatively large, relatively slow main memory. Typically, multiple dynamic random access memory (DRAM) modules comprise the main memory system. The large main memory provides storage for a large number of instructions and/or a large amount of data for use by the microprocessor, providing faster access to the instructions and/or data than may be achieved from a disk storage, for example. However, the access times of modem DRAMs are significantly longer than the clock cycle length of modem microprocessors. The memory access time for each set of bytes being transferred to the microprocessor is therefore long. Accordingly, the main memory system is not a low latency system. Microprocessor performance may suffer due to high memory latency.

In order to allow low latency memory access (thereby increasing the instruction execution efficiency and ultimately microprocessor performance), computer systems typically employ one or more caches to store the most recently accessed data and instructions. Additionally, the microprocessor may employ caches internally. A relatively small number of clock cycles may be required to access data stored in a cache, as opposed to a relatively larger number of clock cycles required to access the main memory.

Low memory latency may be achieved in a computer system if the cache hit rates of the caches employed therein are high. An access is a hit in a cache if the requested data is present within the cache when the access is attempted. On the other hand, an access is a miss in a cache if the requested data is absent from the cache when the access is attempted. Cache hits are provided to the microprocessor in a small number of clock cycles, allowing subsequent accesses to occur more quickly as well and thereby decreasing the effective memory latency. Cache misses require the access to receive data from the main memory, thereby increasing the effective memory latency.

In many applications, different types of data (e.g. constants, execution results, etc.) are used in different ways. For example, constants are read-only and are useful early in the execution pipeline of a microprocessor (e.g. for generating addresses of operands or for the early calculation of intermediate or final execution results involving constants). On the other hand, result data may be write-only (i.e. the results are generated and stored to memory but not used in imminent program execution). Performance of the microprocessor is in many cases unaffected by the point in the execution pipeline at which a result is updated to memory, because often times the result is not immediately needed again. Other data is read/write, in which the values are modified and the modified values subsequently used. A method for decreasing latency to each type of data based upon access mode, is desired.

SUMMARY OF THE INVENTION

The problems outlined above are in large part solved by a microprocessor in accordance with the present invention. The microprocessor described herein is configured to execute a prefetch instruction. The prefetch instruction specifies a cache line to be transferred into the microprocessor, as well as an access mode for the cache line. Furthermore, the microprocessor includes caches optimized for the access modes. The specified cache line is prefetched into the corresponding cache, and is available for optimized access. Advantageously, the prefetched cache lines may be rapidly available to the functional units which access the prefetched cache lines using the access mode specified within the prefetch instruction. Effective memory latency may be decreased due to the reduced latency experienced upon access to the prefetched cache lines. Microprocessor performance may be correspondingly increased.

In one embodiment, the microprocessor includes functional units configured to operate upon various data types. Each different type of functional unit may be connected to different caches which are optimized for the various access modes. The prefetch instruction may include a functional unit specification in addition to the access mode. In this manner, data of a particular type may be prefetched into a cache local to a particular functional unit. Access time to the local caches may be further decreased by the physical location of the caches near the functional unit which accesses those caches. Effective memory latency may be further decreased by prefetching data having a particular data type and access mode into a cache optimized for the access mode and connected to a functional unit configured operate upon that data type.

Broadly speaking, the present invention contemplates a microprocessor comprising a plurality of functional units configured to execute instructions including a prefetch instruction. The prefetch instruction includes a functional unit field identifying one of the plurality of functional units. The identified functional unit is to operate upon data identified by the prefetch instruction. Additionally, the prefetch instruction includes a read/write specifier field indicating an access mode for the data. The microprocessor is configured to prefetch the data in response to the prefetch instruction.

The present invention further contemplates a method for prefetching data in a microprocessor. A prefetch instruction identifying a cache line is executed. The prefetch instruction includes an r/w specifier indicating an access mode for the cache line. Responsive to executing the prefetch instruction, the cache line is fetched into the microprocessor. The cache line is stored in a read-only cache if the access mode is read-only. The read-only cache provides read access to the cache line in response to a load memory operation and inhibits write access to the cache line in response to a store memory operation. If the access mode is write-only, the cache line is stored in a write-only cache. The write-only cache provides write access to the cache line in response to a store memory operation and inhibits read access to the cache line in response to a load memory operation. If the access mode is read/write, the cache line is stored in a read/write cache. The read/write cache provides both read access and write access to the cache line in response to a load memory operation and a store memory operation, respectively.

BRIEF DESCRIPTION OF THE DRAWINGS

Other objects and advantages of the invention will become apparent upon reading the following detailed description and upon reference to the accompanying drawings in which.

Figure 1:
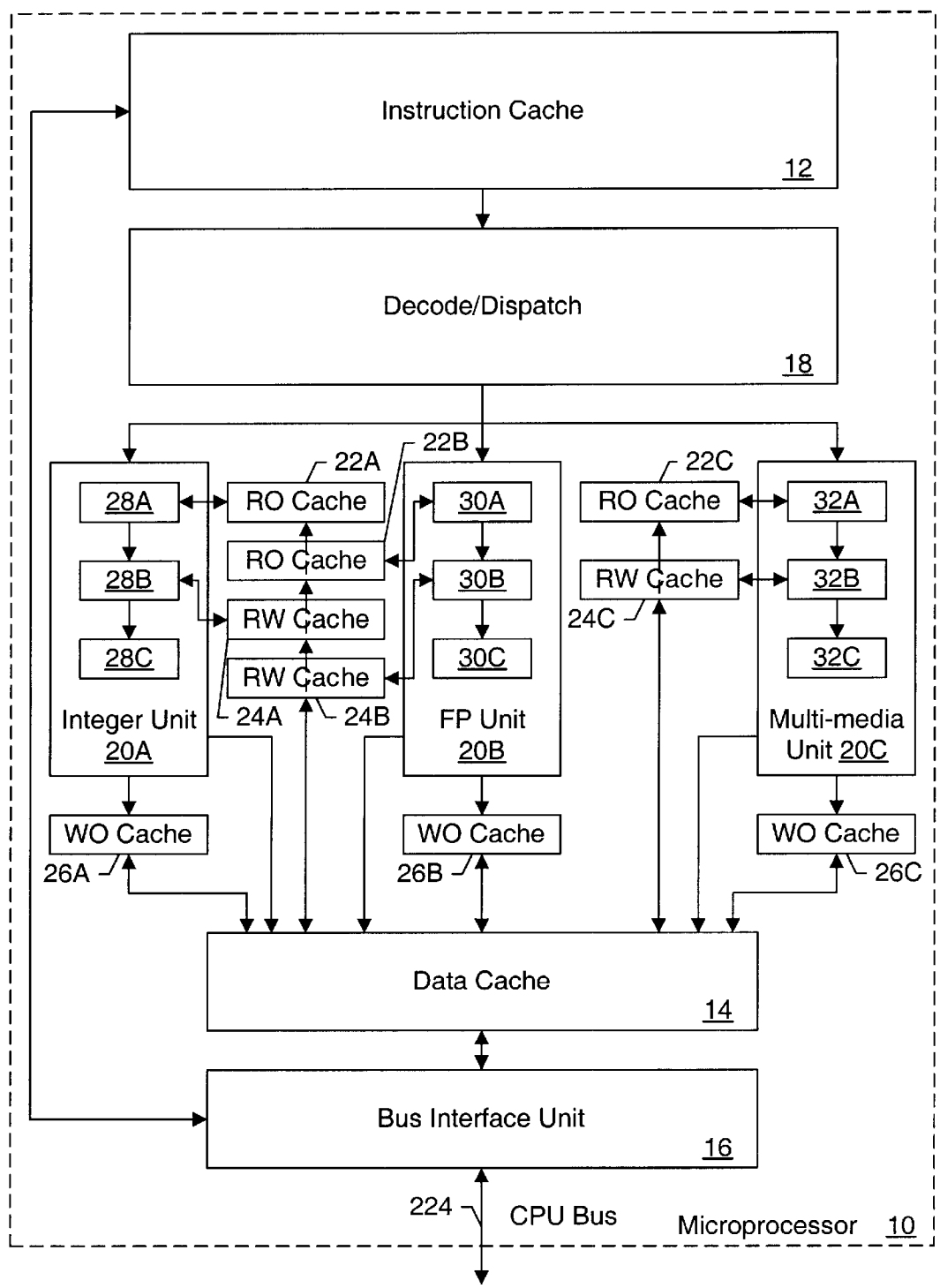
FIG. 1 is a block diagram of one embodiment of a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Other embodiments are possible and contemplated. In the embodiment of FIG. 1, microprocessor 10 includes an instruction cache 12, a data cache 14, a bus interface unit 16, a decode/dispatch unit 18, a plurality of functional units 20A–20C, a plurality of read-only caches 22A–22C, a plurality of read/write caches 24A–24C, and a plurality of write-only caches 26A–26C. Each of functional units 20A–20C includes an execution pipeline comprising a plurality of stages. For example, functional unit 20A includes an execution pipeline having pipeline stages 28A–28C. Similarly, functional unit 20B includes an execution pipeline having pipeline stages 30A–30C and functional unit 20C includes an execution pipeline having pipeline stages 32A–32C.

In the embodiment of FIG. 1, bus interface unit 16 is coupled to a CPU bus 224, instruction cache 12, and data cache 14. Instruction cache 12 is further coupled to decode/dispatch unit 18 which is still further coupled to each of functional units 20A–20C. Functional unit 20A is coupled to read-only cache 22A, read/write cache 24A, and write-only cache 26A. Similarly, functional unit 20B is coupled to read-only cache 22B, read/write cache 24B, and write-only cache 26B and functional unit 20C is coupled to read-only cache 22C, read/write cache 24C, and write-only cache 26C. Additionally, each of functional units 20A–20C are coupled to data cache 14. Still further, each of caches 22A–22C, 24A–24C, and 26A–26C are coupled to data cache 14.

Generally speaking, microprocessor 10 is configured to execute a prefetch instruction. The prefetch instruction specifies a cache line to be transferred into microprocessor 10, as well as an access mode for the cache line. Depending upon the access mode, the prefetched cache line is stored into one of the read-only caches, read/write caches, or write-only caches. Each of the caches may be optimized for the access mode for which that cache is designed. Advantageously, rapid access to data having a particular access mode may be achieved by the cache optimized for that access mode, and the prefetch instruction may be used to transfer data having the particular access mode into the cache optimized for that mode.

Additionally, the prefetch instruction may be configured to indicate a destination functional unit for the data. The destination functional unit is configured to operate upon data having a particular data type. For example, in the embodiment of FIG. 1, functional unit 20A is an integer unit configured to operate upon integer data. Conversely, functional unit 20B is a floating point unit configured to operate upon floating point data and functional unit 20C is a multimedia unit configured to operate upon multimedia data. Since each data type is different, sharing of data between functional units of different types (i.e. functional units designed to operate on different data types) is relatively rare. Accordingly, each different type of functional unit may be coupled to separate caches. The caches may be made relatively small (e.g. 8–32 cache lines), which may further improve access speed. Furthermore, the relatively small storage structures of these caches may be placed near the functional unit which accesses that cache. Since the prefetch instruction specifies the destination functional unit, the data may be placed into the cache (specified by the access mode within the prefetch instruction) which is coupled to the functional unit of the correct type (specified by the prefetch instruction).

Read-only caches 22A–22C may be optimized for read access and may not provide write access except for the storage of cache lines therein. In other words, write access to read-only caches 22A–22C may be provided in any suitable fashion which does not substantially impact read access timing. Advantageously, data which is accessed in a read-only fashion may be read more rapidly from the read-only cache than may be achievable from a general-purpose read/write storage.

Conversely, write-only caches 26A–26C may be optimized for write access and may not provide read access to cache lines stored therein other than for the transfer of the updated cache lines to data cache 14. In other words, read access to write-only caches 26A–26C may be provided in any suitable fashion which does not substantially impact write access timing.

Read/write caches 24A–24C are provided for storing data which is accessed in a read/write mode. More particularly, read/write caches 24A–24C may be used to store data in a temporary register form in which multiple read and write accesses are performed to the data before the data is stored back to memory. Because both read and write accesses are supported by read/write caches 24A–24C, both read and write access paths to read/write caches 24A–24C are optimized. However, because read/write caches 24A–24C are relatively small in size as compared to data cache 14, read and write access to read/write caches 24A–24C may be more rapid than access to data cache 14.

Each of the caches coupled to a particular functional unit are coupled to a particular pipeline stage within the execution pipeline of that functional unit. The pipeline stage to which a particular cache is coupled is determined by the stage at which data having the corresponding access mode is accessed. For example, read-only cache 22A is coupled to pipeline stage 28A within functional unit 20A. Similarly, read-only cache 22B is coupled to pipeline stage 30A within functional unit 20B and read-only cache 22C is coupled to pipeline stage 32A within functional unit 20C. It may be useful to have access to read-only data early in the execution pipeline. Read-only data may comprise constants, for example, which may be used to generate addressed or for early calculation of results involving constants. On the other hand, write-only data may comprise execution results which are not subsequently used by the code being executed (at least not imminently). Therefore, write-only cache 26A may be coupled to pipeline stage 28C (e.g. the last stage of the execution pipeline within functional unit 20A). Similarly, write-only cache 26B may be coupled to pipeline stage 30C (e.g. the last stage of the execution pipeline within functional unit 20B) and write-only cache 26C may be coupled to pipeline stage 32C (e.g. the last stage of the execution pipeline within functional unit 20C). Still further, temporary register data stored in read/write caches 24A–24C are accessed from pipeline stages 28B, 30B, and 32B, respectively. These pipeline stages may be the stages from which a register file (not shown) included within each functional unit is also accessed.

As used herein, the term "prefetch instruction" refers to an instruction within the instruction set (i.e. an instruction assigned a unique encoding among the other instructions within the instruction set) which is defined to cause a cache line to be read into microprocessor 10. The prefetch instruction may exclude a destination operand, such that the state of microprocessor 10 is unmodified by the execution of the prefetch instruction other than the effects on the cache of loading the prefetched cache line. More particularly, no dependencies of subsequent instructions upon the prefetch instruction may be detected, and hence instruction execution is not substantially delayed due to the specified cache line missing in a cache. The cache line is identified by an address generated during execution of the prefetch instruction. One or more address operands of the prefetch instruction are used to generate the address. Accordingly, the cache line is "prefetched" into microprocessor 10 prior to manipulation of the data in the cache line by instructions within the code sequence being executed.

As mentioned above, the prefetch instruction described herein specifies an access mode for the prefetched cache line. The access mode indicates the manner in which the cache line is expected to be accessed by memory operations performed subsequent to the prefetch instruction. In one embodiment, the specifiable access modes include a read-only mode, a write-only mode, and a read/write mode. The read-only mode indicates that the cache line is expected to be read but not written. Conversely, the write-only mode indicates the cache line is expected be written but not read. The read/write access mode indicates that the cache line is expected to be read and written repeatedly.

In addition to executing the prefetch instruction, each of functional units 20A–20C are configured to perform memory operations. A memory operation is a transfer data between memory and microprocessor 10. A load memory operation specifies a read transfer in which data is transmitted from memory to microprocessor 10. Conversely, a store memory operation specifies a write transfer in which data is transmitted from microprocessor 10 to memory. It is noted that, while memory operations specify a transfer of data to/from memory, the memory operations may be completed internal to microprocessor 10 if a hit in one of the caches therein is detected. It is further noted that, in alternative embodiments, one or more load/store units may be provided for performing memory operations.

Still further, each of functional units 20A–20C are configured to execute various instructions to manipulate data having the data type for which that functional unit is designed. For example, integer unit 20A is configured to perform various arithmetic and logical operations upon integer data. Floating point unit 20B is configured perform various arithmetic operations upon floating point data. Multimedia unit 20C is configured to perform various arithmetic and logical operations upon multimedia data. Multimedia data may comprise, for example, packed bytes, packed words, packed doublewords, etc. (according to the MMX data type defined by the x86 instruction set).

Generally, a "functional unit" is a unit configured to execute one or more instructions. As used herein, an "execution pipeline" is a pipeline comprising at least two stages connected to perform the execution of instructions. A pipeline stage is a portion of a pipeline configured to perform a specific function upon the output of a previous pipeline stage and configured to convey the result of that specific function to a subsequent pipeline stage. Pipeline stages are delimited by storage devices (e.g. registers, latches, etc.). As shown in FIG. 1, pipeline stage 28A is first in the execution pipeline, followed by pipeline stage 28B and subsequently pipeline stage 28C. Similarly, pipeline stage 30A is first in the execution pipeline, followed by pipeline stage 30B and subsequently pipeline stage 30C and pipeline stage 32A is first in the execution pipeline, followed by pipeline stage 32B and subsequently pipeline stage 32C.

While microprocessor 10 provides a variety of caches for storing data expected to be accessed in a particular access mode, microprocessor 10 provides for correct execution if the data is accessed in a mode other than that specified by a prefetch instruction used to transfer the data into the cache. For example, if a store memory operation which updates data stored in one of read-only caches 22A–22C is executed, read-only caches 22A–22C are configured to invalidate the cache line which is affected by the store memory operation. Furthermore, microprocessor 10 may signal an exception corresponding to the store memory operation to ensure that any load memory operations subsequent to the store memory operation which may have accessed read-only caches 22A–22C are re-executed and receive the updated data. Similarly, if a load memory operation is executed and the load memory operation accesses data stored in one of write-only caches 26A–26C, write-only caches 26A–26C transfer the accessed cache line to data cache 14. Additionally, microprocessor 10 may signal an exception corresponding to the load memory operation to ensure that the load memory operation receives the updated data.

As used herein, the term "exception" refers to a disruption in the execution of a code sequence. Exceptions may be handled in a variety fashions. Hardware exceptions are handled by dedicated hardware within microprocessor 10. The exceptions mentioned above are preferably handled as hardware exceptions. These exceptions may comprise purging instructions subsequent to the instruction for which the exception is signalled from the execution pipelines of microprocessor 10 and re-fetching the instructions for subsequent execution. Other exceptions may be software exceptions which may be handled by directing program execution to a predetermined address. Still further, certain embodiments of microprocessor 10 may include a microcode unit for executing microcoded routines. Some exceptions may be classified as microcode exceptions which are handled by the microcode unit via a predetermined microcode routine.

It is noted that, by causing an exception in response to data being stored in a cache which does not support access in response to a particular memory operation, the circuitry for invalidating/transferring the data from the caches to data cache 14 may be de-optimized. For example, multiple clock cycles may be used to perform the invalidation/transfer because new instructions subsequent to the exception may not arrive in the functional units for several clock cycles.

Functional units 20A–20C are configured to search the read-only caches and read/write caches connected thereto in order to perform load memory operations. If a load memory operation is determined to miss these caches, data cache 14 is accessed. If the load memory operation also misses data cache 14, the requested data is transferred from memory by bus interface unit 16 using CPU bus 224. Similarly, functional units 20A–20C are configured to search be read/write caches and write-only caches connected thereto in order to perform store memory operations. If a store memory operation is determined to miss these caches, data cache 14 is accessed. If the store memory operation also misses data cache 14, requested data is transferred from memory by bus interface unit 16 using CPU bus 224 and then updated with the data specified by the store memory operation.

In one embodiment, the memory operations may be coded with an access mode as well. In such an embodiment, only the cache corresponding to the access mode may be searched. If a miss is detected, the executing functional unit may search data cache 14.

Instruction cache 12 is a high speed cache memory for storing instructions. Any suitable configuration may be used for instruction cache 12, including, for example, a set-associative or direct-mapped configuration. Instructions are fetched from instruction cache 12 by decode/dispatch unit 18. The fetched instructions are decoded by decode/dispatch unit 18, and are dispatched to one or more of functional units 20A–20C for execution. Instruction fetches which miss instruction cache 12 cause an instruction cache line to be transferred into instruction cache 12 via bus interface unit 16.

Decode/dispatch unit 18 may further include circuitry for handling the in-order retirement instructions for embodiments of microprocessor 10 configured to perform out-of-order instruction execution. For example, decode/dispatch unit 18 may include a reorder buffer if desired. Alternatively, decode/dispatch unit 18 may comprise a scheduling window into which instructions are fetched and from which instructions are dispatched as their operands become available via execution of previous instructions.

Data cache 14, similar to instruction cache 12, is a high speed cache memory for storing data to be operated upon according to instructions executed by microprocessor 10. Data cache 14 may employ any suitable configuration, including, for example, a set-associative or direct-mapped configuration.

Bus interface unit 16 is generally configured to communicate with devices attached to microprocessor 10. As mentioned above, instruction cache misses cause bus interface unit 16 to fetch the missing cache line using CPU bus 224. Bus interface unit 16 transfers the instruction cache line to instruction cache 12 upon receipt thereof from CPU bus 224. Similarly, prefetch instructions and memory operations which miss read-only caches 22A–22C, read/write caches 24A–24C, write-only caches 26A–26C, and data cache 14 cause bus interface unit 16 to fetch the missing cache lines via CPU bus 224. Upon receiving the missing cache line, bus interface unit 16 routes the cache line to one of caches 22A–22C, 24A–24C, or 26A–26C (in response to a prefetch instruction, according to the access mode specified by the prefetch instruction) and/or to data cache 14.

Figure 2:
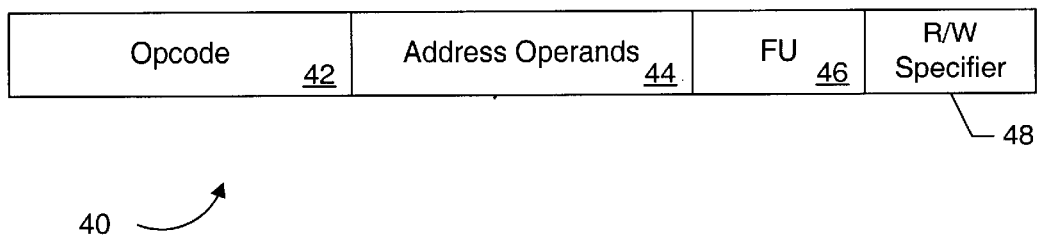
FIG. 2 is a block diagram of one embodiment of a prefetch instruction.

Turning next to FIG. 2, an exemplary prefetch instruction 40 is shown. Prefetch instruction 40 is one embodiment of a prefetch instruction which may be suitable for one embodiment of microprocessor 10. Other embodiments are possible and contemplated. As shown in FIG. 2, prefetch instruction 40 includes an opcode field 42, an address operands field 44, a functional unit field 46, and a R/W specifier field 48.

Opcode field 42 stores the opcode of the instruction, which identifies the prefetch instruction within the instruction set employed by microprocessor 10. In other words, one encoding of opcode field 42 identifies the prefetch instruction and other encodings identify other instructions within the instruction set.

Address operands field 44 includes one or more address operands identifying the address of the cache line to be prefetched. The address operands may include one or more register addresses and/or a displacement field. The value stored in the specified registers (if any) and the displacement value (if any) are added together to generate the address of the prefetched cache line.

Functional unit field 46 stores an indication of the destination functional unit for the prefetched cache line. The prefetched cache line is stored into one of the caches connected to the functional unit identified by functional unit field 46. R/W specifier field 48 identifies the access mode for the prefetched cache line. The access mode identifies which one of the caches connected to the functional unit identified by functional unit field 46 is to store the prefetched cache line. Accordingly, the combination of functional unit field 46 and R/W specifier field 48 identifies a particular one of caches 22A–22C, 24A–24C, and 26A–26C. It is noted that the prefetched cache line may be stored in data cache 14 as well as the cache identified by the combination of functional unit field 46 and R/W specifier field 48. Additionally, microprocessor 10 may be configured to search data cache 14 prior to causing bus interface unit 16 to prefetch the cache line via CPU bus 224.

As used herein, the term "field" refers to one or more bits within an entity which are logically grouped together and are interpreted to determine an attribute of that entity. For example, functional unit field 46 is a field within the prefetch instruction 40 entity.

Figure 3:
FIG. 3 is a pair of tables defining exemplary encoding for fields shown in FIG. 2 according to one embodiment of the microprocessor shown in FIG. 1.

Turning now to FIG. 3, a table 50 is shown illustrating an exemplary encoding which may be employed by one embodiment of functional unit field 46. Additionally a table 52 is shown illustrating an exemplary encoding which may be employed by one embodiment of R/W specifier field 48. Other embodiments are possible and contemplated.

As shown in table 50, functional unit field 46 may comprise a two bit field encoding a destination functional unit for the embodiment of microprocessor 10 shown in FIG. 1. Similarly, table 52 illustrates a R/W specifier field 48 comprising two bits encoded to select an access mode for the prefetched cache line. More particularly, if R/W specifier field 48 selects a read-only access mode, the prefetched cache line may be stored into one of read-only caches 22A–22C. Similarly, if R/W specifier field 48 selects a write-only access mode, the prefetched cache line may be stored into one of write-only caches 26A–26C. Still further, if R/W specifier field 48 selects a read/write access mode (indicating that the prefetched cache line is expected to be operated upon similar to values stored in a temporary register), the prefetched cache line may be stored into one of read/write caches 24A–24C.

As mentioned above, load and store memory operations may also include a R/W specifier field similar to R/W specifier field 48. The R/W specifier field may be encoded similar to the encoding illustrated in table 52 to identify which of read-only caches 22A–22C, read/write caches 24A–24C, and/or write-only caches 26A–26C are to be searched for the data specified by the load/store memory operation. Additionally, an encoding may be defined for the specifier field of the load/store memory operations to indicate that only data cache 14 is to be searched for the specified data.

Figure 4:
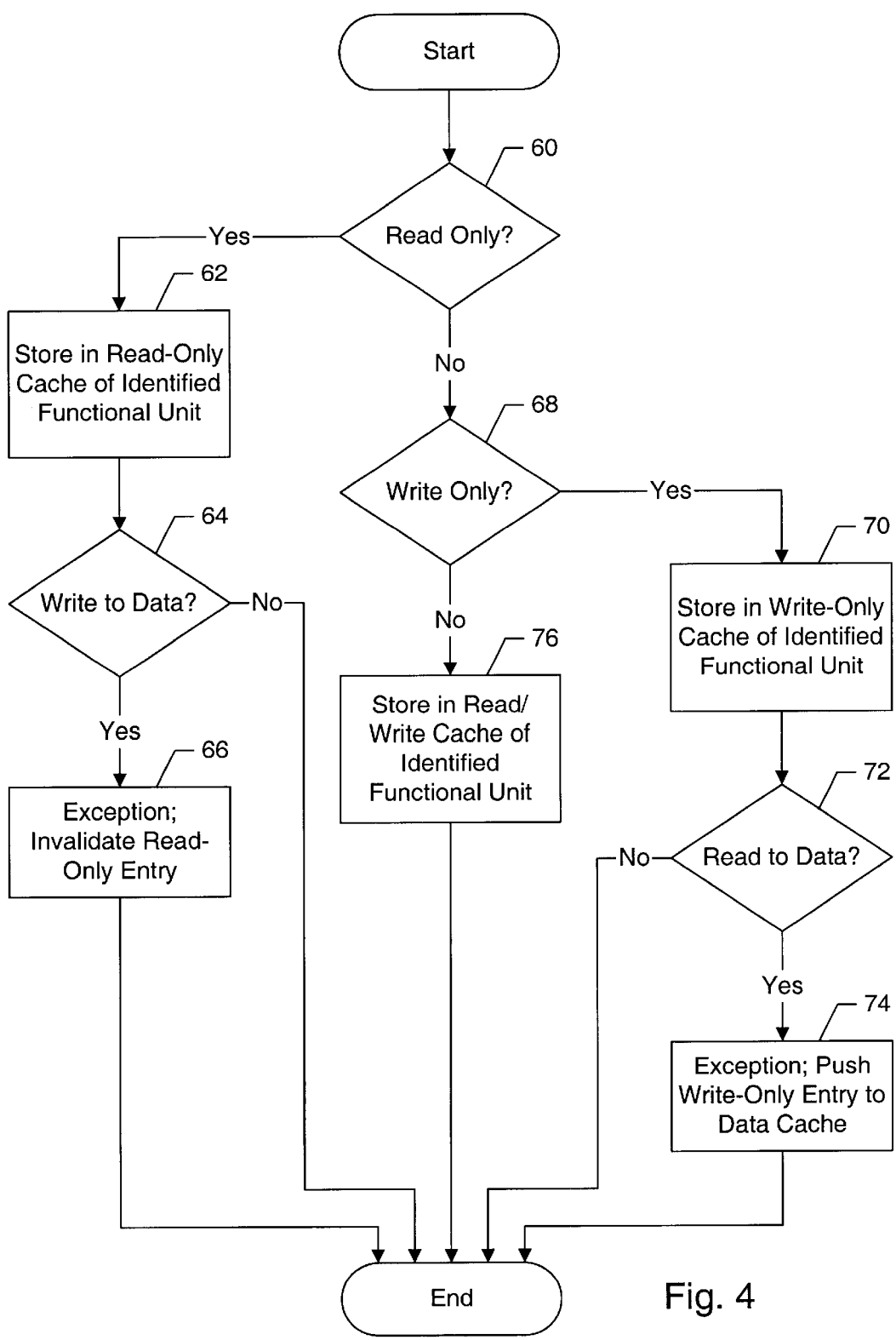
FIG. 4 is a flowchart illustrating operation of one embodiment of the caches shown in FIG. 1.

Turning next to FIG. 4, a flowchart is shown illustrating operation of one embodiment of read-only caches 22A–22C, read/write caches 24A–24C and write-only caches 26A–26C responsive to prefetch instructions and memory operations. Other embodiments are possible and contemplated. Although illustrated in FIG. 4 as a set of steps in a particular order, these steps may be performed in any suitable order. Additionally, it is noted that the circuitry within microprocessor 10 may perform the steps in a parallel fashion to achieve the desired result.

If the access mode specified by the prefetch instruction is read-only (decision block 60), microprocessor 10 routes the prefetched cache line to the read-only cache connected to the functional unit identified by the prefetch instruction (step 62). If a subsequent store memory operation is detected to the prefetched cache line (decision block 64), microprocessor 10 signals an exception upon the store memory operation. Additionally, microprocessor 10 invalidates the prefetched cache line within the read-only cache (step 66).

If the access mode specified by the prefetch instruction is write-only (decision block 68), microprocessor 10 routes the prefetched cache line to the write-only cache connected to the functional unit identified by the prefetch instruction (step 70). If a subsequent load memory operation is detected to the prefetched cache line (decision block 72), microprocessor 10 signals an exception upon the load memory operation. Additionally, microprocessor 10 transfers (or "pushes") the affected cache line to data cache 14 (invalidating the copy within the write-only cache) (step 74).

If the access mode specified by the prefetch instruction is neither read-only nor write-only, then the access mode is read/write in the present embodiment. Accordingly, the prefetched cache line is stored into the read/write cache connected to the functional unit identified by the prefetch instruction (step 76).

It is noted that microprocessor 10 may also monitor load/store memory operations performed by each functional unit to cache lines stored within the read-only caches, write-only caches, or read/write caches connected to the other functional units. If such a memory operation is detected, microprocessor 10 may again signal an exception upon the memory operation and may cause the cache storing the cache line to invalidate/push the cache line to data cache 14. It is further noted that this monitoring function may be employed within data cache 14 if, for example, each of the functional units 20A–20C are configured to convey memory operations which hit in the caches 22A–22C, 24A–24C, or 26A–26C local that functional unit to data cache 14 for monitoring purposes.

Figure 5:
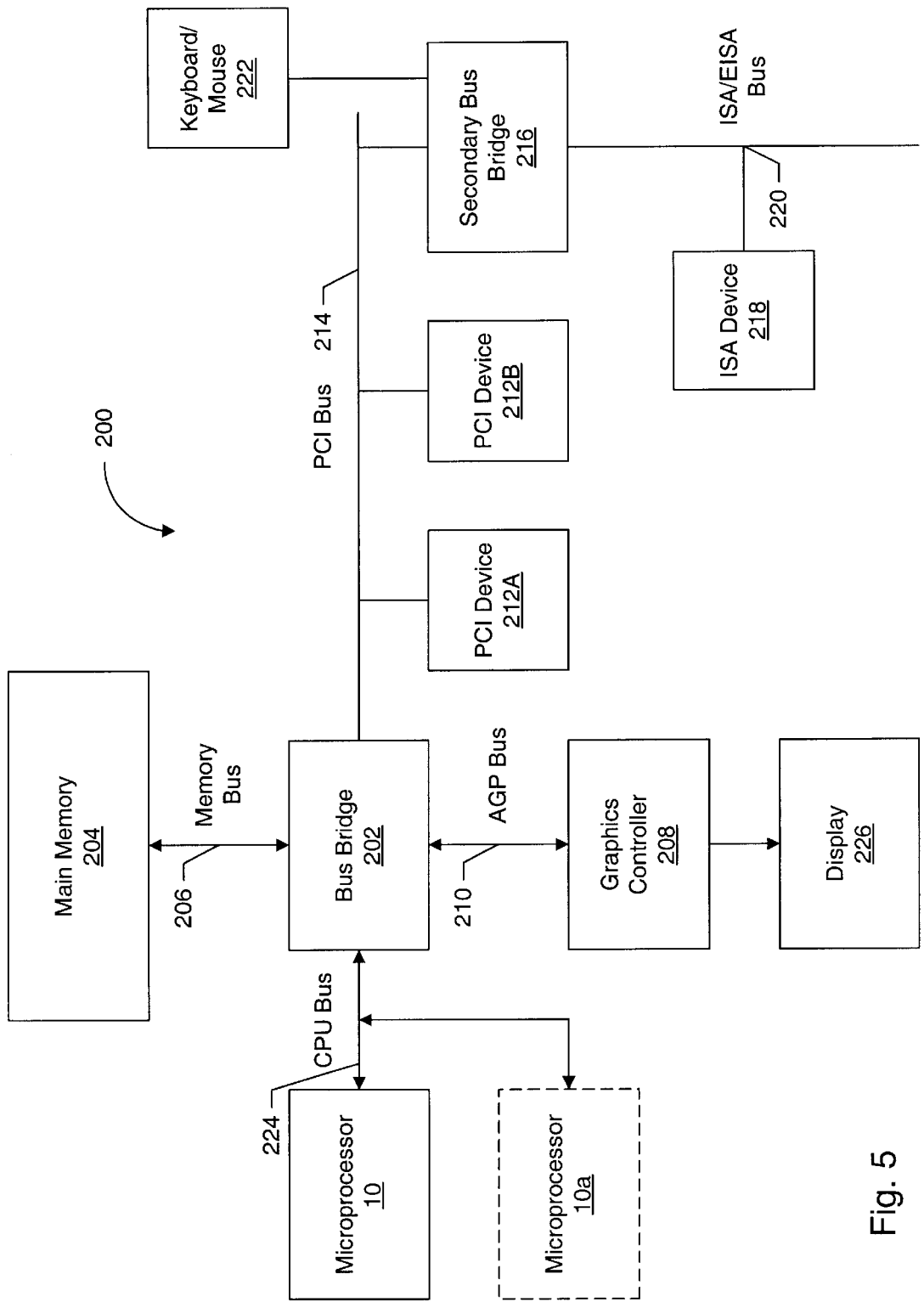
FIG. 5 is a block diagram of one embodiment of a computer system including the microprocessor shown in FIG. 1.

Turning now to FIG. 5, a block diagram of one embodiment of a computer system 200 including microprocessor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Microprocessor 10 is coupled to bus bridge 202 through a CPU bus 224.

Bus bridge 202 provides an interface between microprocessor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between microprocessor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which microprocessor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional microprocessors (e.g. microprocessor 10a shown as an optional component of computer system 200). Microprocessor 10a may be similar to microprocessor 10. More particularly, microprocessor 10a may be an identical copy of microprocessor 10. Microprocessor 10a may share CPU bus 224 with microprocessor 10 (as shown in FIG. 5) or may be connected to bus bridge 202 via an independent bus.

In accordance with the above disclosure, a microprocessor has been shown which is configured to execute a prefetch instruction. The prefetch instruction specifies an access mode and a destination functional unit for the cache line identified by the prefetch instruction. The prefetched cache line may be cached in a cache which is: (i) optimized for the specified access mode; and (ii) local to the destination functional unit. Access to the cache line may be more rapid due to the optimization of the cache for the specified access mode as well as due to the local nature of the cache. Advantageously, memory latency may be decreased by the more rapid access to the local caches.

Numerous variations and modifications will become apparent to those skilled in the art once the above disclosure is fully appreciated. It is intended that the following claims be interpreted to embrace all such variations and modifications.

What is claimed is:

1. A microprocessor comprising a plurality of functional units configured to execute instructions including a prefetch instruction, said prefetch instruction including:
   (i) a functional unit field identifying one of said plurality of functional units which is to operate upon data identified by said prefetch instruction; and
   (ii) a read/write specifier field indicating one of a read-only access mode, a read/write access mode, and a write-only access mode for said data;
   wherein said microprocessor is configured to prefetch said data in response to said prefetch instruction, and wherein said microprocessor further comprises at least three caches, and wherein said microprocessor is configured to store said data in one of said at least three caches responsive to said read/write specifier field.

2. The microprocessor as recited in claim 1 wherein each one of said plurality of functional units comprises an execution pipeline including at least a first stage, a second stage, and a third stage, and wherein said microprocessor further comprises:
   a first plurality of caches including one of said at least three caches, each of said first plurality of caches coupled to said first stage of said execution pipeline of a respective one of said plurality of functional units, wherein said microprocessor is configured to store said data in a first one of said first plurality of caches if said read/write specifier indicates read-only, said respective one of said plurality of functional units corresponding to said first one of said first plurality of caches being identified by said functional unit field;
   a second plurality of caches including one of said at least three caches, each of said second plurality of caches coupled to said second stage of said execution pipeline of said respective one of said plurality of functional units, wherein said microprocessor is configured to store said data in a first one of said second plurality of caches if said read/write specifier indicates read/write, said respective one of said plurality of functional units corresponding to said first one of said second plurality of caches being identified by said functional unit field; and
   a third plurality of caches including one of said at least three caches, each of said third plurality of caches coupled to said third stage of said execution pipeline of said respective one of said plurality of functional units, wherein said microprocessor is configured to store said data in a first one of said third plurality of caches if said read/write specifier indicates write-only, said respective one of said plurality of functional units corresponding to said first one of said third plurality of caches being identified by said functional unit field.

3. The microprocessor as recited in claim 1 wherein each one of said plurality of functional units comprises an execution pipeline including at least a first stage, and wherein said microprocessor further comprises:
   a first plurality of caches including one of said at least three caches, each of said first plurality of caches coupled to said first stage of said execution pipeline of a respective one of said plurality of functional units, wherein said microprocessor is configured to store said data in a first one of said first plurality of caches if said read/write specifier indicates read-only, said respective one of said plurality of functional units corresponding to said first one of said first plurality of caches being identified by said functional unit field.

4. The microprocessor as recited in claim 3 wherein said first one of said first plurality of caches is configured to invalidate said data in response to a store memory operation specifying said data.

5. The microprocessor as recited in claim 4 wherein said microprocessor is further configured to signal an exception on said store memory operation.

6. The microprocessor as recited in claim 1 wherein each one of said plurality of functional units comprises an execution pipeline including at least a first stage, and wherein said microprocessor further comprises:
   a first plurality of caches including one of said at least three caches, each of said first plurality of caches coupled to said first stage of said execution pipeline of a respective one of said plurality of functional units, wherein said microprocessor is configured to store said data in a first one of said first plurality of caches if said read/write specifier indicates read/write, said respective one of said plurality of functional units corresponding to said first one of said first plurality of caches being identified by said functional unit field.

7. The microprocessor as recited in claim 1 wherein each one of said plurality of functional units comprises an execution pipeline including at least a first stage, and wherein said microprocessor further comprises:

a first plurality of caches including one of said at least three caches, each of said first plurality of caches coupled to said first stage of said execution pipeline of a respective one of said plurality of functional units, wherein said microprocessor is configured to store said data in a first one of said first plurality of caches if said read/write specifier indicates write-only, said respective one of said plurality of functional units corresponding to said first one of said first plurality of caches being identified by said functional unit field.

8. The microprocessor as recited in claim 7 further comprising a data cache coupled to said first plurality of caches, wherein said first one of said first plurality of caches is configured to transfer said data to said data cache responsive to a load memory operation specifying said data.

9. The microprocessor as recited in claim 8 wherein said microprocessor is configured to signal an exception on said load memory operation.

10. A method comprising:

executing a prefetch instruction identifying a cache line, said prefetch instruction including: (i) a functional unit field identifying one of a plurality of functional units which is to operate upon said cache line, and (ii) a read/write specifier field indicating one of a read-only access mode, a read/write access mode, and a write-only access mode for said cache line;

fetching said cache line into said microprocessor responsive to said executing;

storing said cache line in one of a plurality of caches coupled to said one of said plurality of functional units responsive to said read/write specifier field.

11. The method as recited in claim 10 wherein said storing comprises storing said cache line into a first cache of said plurality of caches, said first cache configured to store said cache line in said read-only access mode.

12. The method as recited in claim 11 further comprising:

executing a store memory operation which updates said cache line; and invalidating said cache line in said first cache responsive to said executing said store memory operation.

13. The method as recited in claim 10 wherein said storing comprises storing, said cache line into a first cache of said plurality of caches, said first cache configured to store said cache line in said write-only access mode.

14. The method as recited in claim 13 wherein further comprising:

executing a load memory operation specifying said cache line; and moving said cache line to a data cache responsive to said executing.

15. The method as recited in claim 10 wherein said storing comprises storing said cache line into a first cache of said plurality of caches, said first cache configured to store said cache line in said read/write access mode.

16. The method as recited in claim 10 wherein said storing comprises storing said cache line into one of a first cache of said plurality of caches, a second cache of said plurality of caches, and a third cache of said plurality of caches, wherein said first cache is configured to store said cache line in a read-only access mode, and wherein said second cache is configured to store said cache line in a write-only access mode, and wherein said third cache is configured to store said cache line in a read/write access mode.

17. The method as recited in claim 16 wherein said one of said plurality of functional units comprises a pipeline including at least a first stage, a second stage, and a third stage, the method further comprising:

accessing said first cache from said first stage;

accessing said second cache from said second stage; and accessing said third cache from said third stage.

18. A computer system comprising:

a microprocessor including a plurality of functional units configured to execute instructions including a prefetch instruction, said prefetch instruction including:

(i) a functional unit field identifying one of said plurality of functional units which is to operate upon data identified by said prefetch instruction; and (ii) a read/write specifier field indicating one of a read-only access mode, a read/write access mode, and a write-only access mode for said data;

wherein said microprocessor is configured to prefetch said data in response to said prefetch instruction, and wherein said microprocessor further comprises at least three caches, and wherein said microprocessor is configured to store said data in one of said at least three caches responsive to said read/write specifier field; and a memory coupled to said microprocessor and configured to store said data.

19. The computer system as recited in claim 18 further comprising a second microprocessor including a plurality of functional units configured to execute instructions including a prefetch instruction, said prefetch instruction including:

(i) a functional unit field identifying one of said plurality of functional units which is to operate upon data identified by said prefetch instruction; and (ii) a read/write specifier field indicating one of a read-only access mode, a read/write access mode, and a write-only access mode for said data;

wherein said microprocessor is configured to prefetch said data in response to said prefetch instruction, and wherein said microprocessor further comprises at least three caches, and wherein said microprocessor is configured to store said data in one of said at least three caches responsive to said read/write specifier field.

20. The computer system as recited in claim 18 further comprising a modem.

* * * * *